United States Patent [19]

Hartung et al.

[11] Patent Number: 4,984,757
[45] Date of Patent: Jan. 15, 1991

[54] TRAPEZE MOUNT FOR AIRBORNE TREE TRIMMING APPARATUS

[76] Inventors: Joe Hartung, 52 Robin Dr., Ventress, La. 70783; William C. Cox, III, 2016 Shadowood Ct., Columbia, S.C. 29212

[21] Appl. No.: 358,594

[22] Filed: May 30, 1989

[51] Int. Cl.$^5$ ............................................... B64D 1/12
[52] U.S. Cl. ................................. 244/137.4; 144/2 Z; 56/235; 56/119
[58] Field of Search ............... 244/17.11, 118.1, 137.1; 144/2 Z, 3 D, 343; 56/DIG. 9, 11.9, 235

[56] References Cited

U.S. PATENT DOCUMENTS

| | | | |
|---|---|---|---|
| 2,707,008 | 4/1955 | Bannister | 144/2 Z |
| 4,554,781 | 11/1985 | Rogers | 56/235 |
| 4,815,263 | 3/1989 | Hartung et al. | 56/235 |

Primary Examiner—Sherman Basinger
Assistant Examiner—Anne E. Bidwell
Attorney, Agent, or Firm—John M. Harrison

[57] ABSTRACT

A trapeze mount for mounting an airborne tree trimming apparatus on a helicopter or the like and operating the airborne tree trimming apparatus independently of the helicopter. The trapeze mount is designed to suspend a boom from the helicopter by means of a boom mount bar, which boom supports a plurality of circular saw blades arranged in tandem, coplanar relationship. The trapeze mount includes a pair of downwardly-extending pivot bars, the upper ends of which are pivotally attached to the helicopter fuselage and the opposite, lower ends connected by a cross-bar. A sliding collar is pivotally mounted on the cross-bar by means of a trapeze pivot joint and the sliding collar slidably engages the boom mount bar, which is pivotally attached at one end to a conventional quick-release hook mounted on the fuselage of the helicopter between the pivot bars. The opposite end of the boom mount bar is attached to a lower pivot collar which carries the upper end of the boom upon which the circular saw blades are mounted. The trapeze mount facilitates rearward extension of the boom mount bar, boom and circular saw blades when the airborne tree trimming apparatus is placed on or removed from supports located on the ground, and downward disposition of the boom mount bar, boom and circular saw blades when the airborne tree trimming apparatus is suspended in functional cutting configuration as the helicopter is airborne.

21 Claims, 2 Drawing Sheets

U.S. Patent    Jan. 15, 1991    Sheet 1 of 2    4,984,757
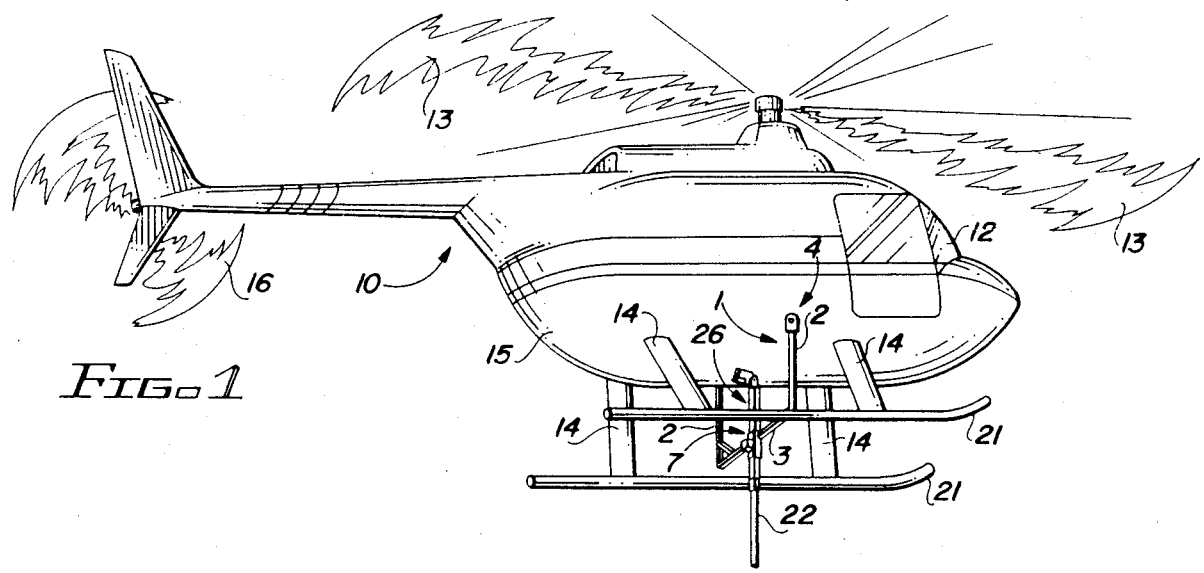
FIG. 1
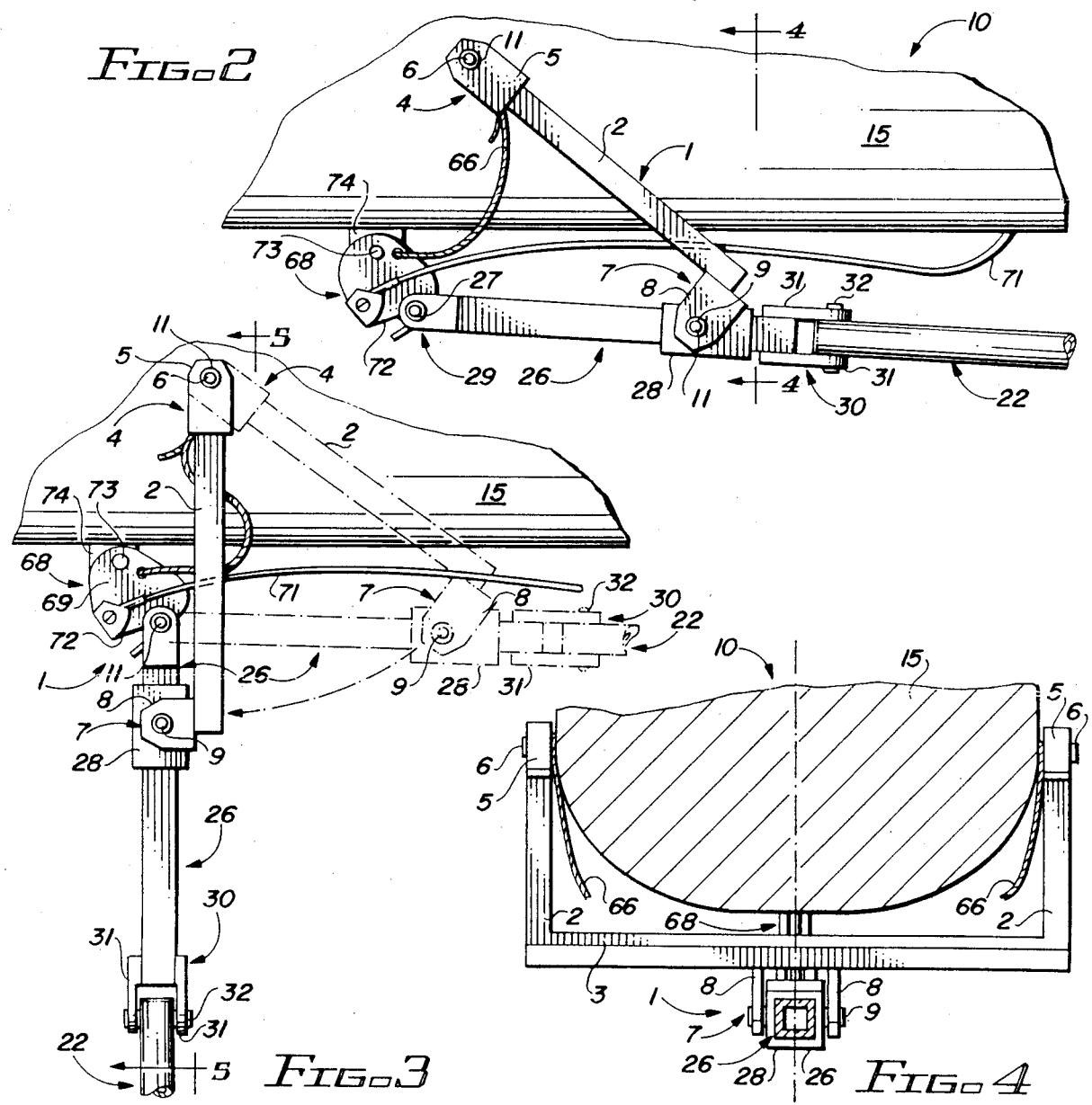
FIG. 2
FIG. 3
FIG. 4

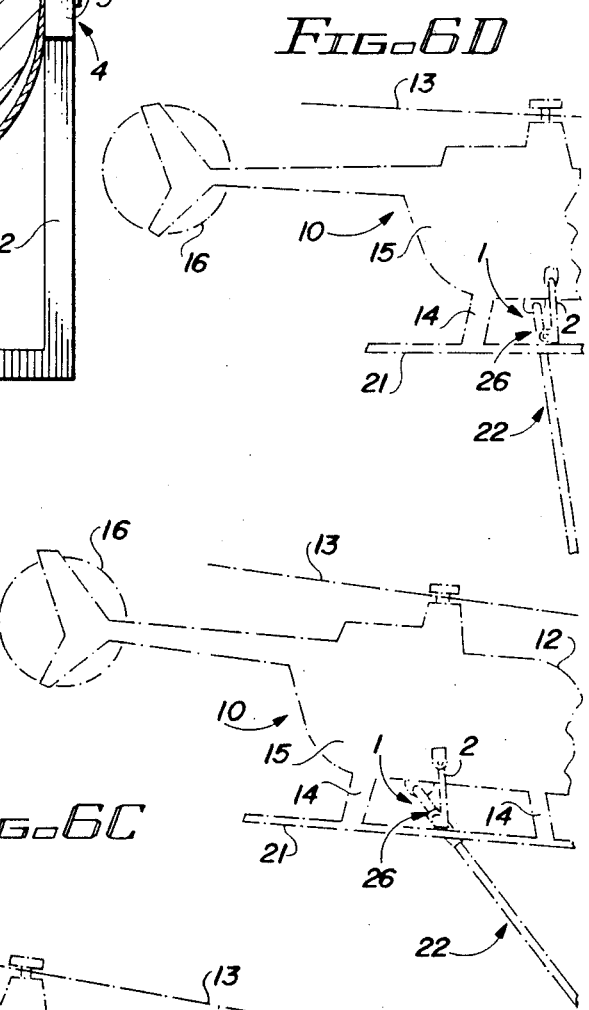
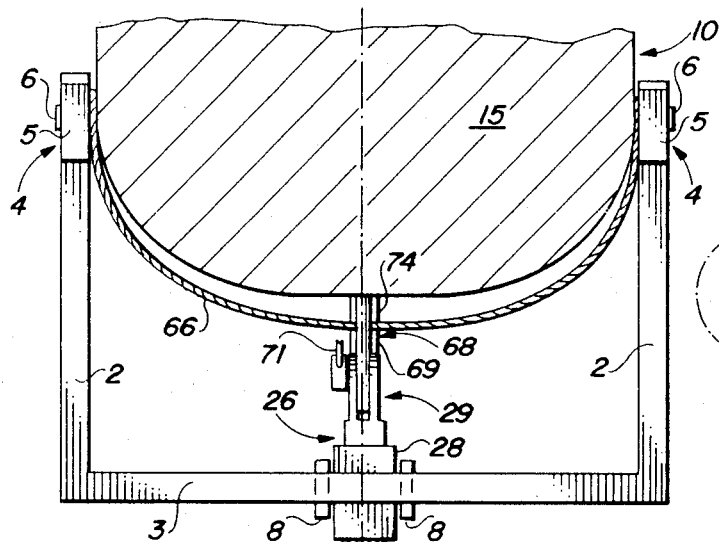
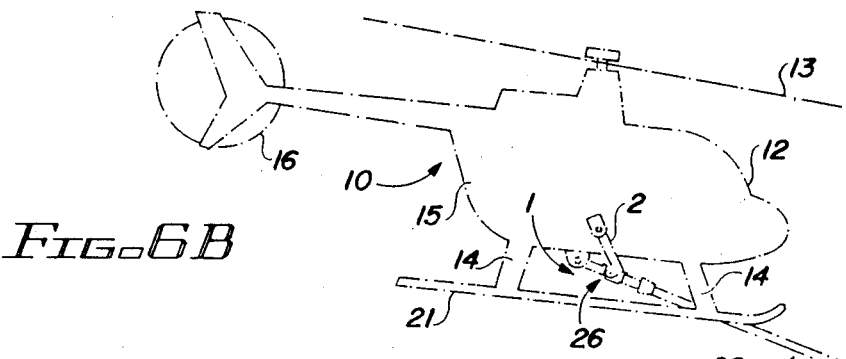
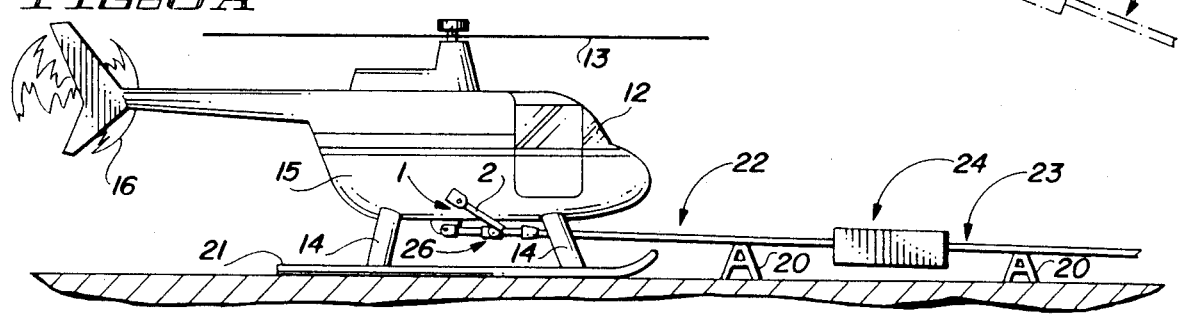

TRAPEZE MOUNT FOR AIRBORNE TREE TRIMMING APPARATUS

BACKGROUND OF THE INVENTION

1. Field of the Invention

This invention relates to a tree trimming apparatus which is especially suitable for the airborne trimming of rights-of-way adjacent to electric power lines at a selected distance from the ground. More particularly, the invention relates to a trapeze mount for suspending an airborne tree trimming apparatus during functional cutting configuration and facilitates pivoting of the tree trimming apparatus into horizontal, stored location on ground supports when not in use. In a preferred embodiment, the tree trimming apparatus includes an articulated boom designed for suspension beneath a helicopter undercarriage by means of a trapeze mount, with ten or more rotating circular blades mounted in coplanar, closely-spaced, tandem relationship on the boom. The circular saw blades are typically powered by an internal combustion engine mounted on a drive or engine assembly of the boom and extend outwardly of the boom structure to facilitate cutting large tree branches which are six to eight inches or more in diameter, as well as smaller woody growth.

The trapeze and boom-mounted circular saw blades rotate in a substantially vertical plane when operational, with all blades oriented outwardly of the supporting boom. The trapeze mount is designed to facilitate rearward extension of the boom and the circular saw blades when the boom and circular saw blades are lowered on supports mounted on the ground and downward extension of the boom and saw blades in functional, cutting configuration when the helicopter is airborne. Accordingly, as the helicopter passes along the edge of a row of trees to be cut, the circular saw blades are always oriented on the tree-side of the boom and are adapted to engage and cut the branches through. The severed branches then fall away on the boom-side of the tree trimming apparatus. The boom carrying the saw blades is connected to a boom mount bar in the trapeze mount, by means of a lower pivot collar which allows the boom and saw blades to swing laterally from side to side with respect to the flight path of the helicopter. The boom is also pivotally-mounted with the boom mount bar about a transverse axis which is substantially perpendicular to the direction of motion of the helicopter, a feature which not only aids in properly orienting the apparatus during take-off and landing, but also permits the apparatus to yield slightly to the rear when encountering numerous or large branches during airborne operation. Thus, while the helicopter speed may be five to ten feet per second, the forward cutting speed of the circular saw blades through very large branches along the flight path beneath the helicopter may be somewhat less than this speed. The greater the average speed which is attainable for the helicopter at effective cutting rates, the more cost-effective the clearing operation will be.

The problem of encroachment of trees and other woody growth in power line rights-of-way and other locations which need to be kept free of trees and brush has been commonly solved with ground or air-applied herbicides. Helicopters have long played a large and important role in spraying herbicides to prevent the encroachment of trees and plants on such rights-of-way. However, the spraying of herbicides for woody growth control is sometimes undesirable, particularly during windy weather, since the herbicide is sometimes blown from the rights-of-way onto adjacent crops and animals. The alternative of cutting encroaching tree branches and other woody growth using ground vehicles or on foot has proved to be very expensive and time consuming, particularly in remote areas.

2. Description of the Prior Art

The use of multiple, air-borne, hydraulically-operated circular saw blades mounted on a boom for use in trimming trees along power line rights-of-way is detailed in U.S. Pat. No. 4,544,781, dated Nov. 26, 1985, to Randall Rogers. A "Ground-Operated Apparatus for Trimming Trees, Orchards and Like Applications" is detailed in U.S. Pat. No. 4,067,178, dated Jan. 10, 1978, to Charles Miller. While perhaps suitable for use in the orderly environment of a fruit orchard, such ground vehicle-mounted equipment is of limited use in trimming trees adjacent to electric utility rights-of-way in rural and remote areas. Furthermore, apparatus such as that detailed in U.S. Pat. No. 4,067,178, is clearly not adaptable for mounting on a helicopter or other aircraft. A number of other patents disclose multiple circular saw blades for tree trimming purposes, the most pertinent of which patents are listed below. These patents describe non-coplanar, circular saw blades which are used in controlled, ground vehicle-supported tree trimming apparatus:

| U.S. Pat. No. | Patentee: | Date Issued: |
| --- | --- | --- |
| 3,487,615 | C. O. Leydig, et | April 1, 1968 |
| 3,913,304 | Paul Jodoin | October 21, 1975 |
| 3,952,485 | L. R. McRobert | April 27, 1976 |
| 4,302,922 | H. F. Guerndt, Jr. et al | December 1, 1981 |

My co-pending U.S. patent application Ser. No. 07/197,025, filed May 20, 1988, entitled AirBorne Tree Trimming Apparatus, details an airborne tree trimming apparatus for installation on a helicopter, which apparatus includes a boom extension vertically suspended from the helicopter and multiple circular saw blades arranged in tandem, coplanar relationship on an operating boom which is attached to the boom extension by means of a boom pivot. Circular saw blades are designed to rotate about parallel, substantially horizontal axes which are oriented substantially at right angles to the normal direction of motion of the helicopter and are belt-driven by an internal combustion engine that is also mounted on the operating boom above the circular saw blades. The boom is attached to a quick-release hook which engages the top of the boom structure to facilitate towing of the boom and the saw blades beneath the helicopter in cutting configuration and resting the boom and saw blades on spaced, ground-oriented supports after the cutting operation is complete.

The present invention permits rapid and accurate trimming of trees adjacent to electric utility and other rights-of-way in a safe and efficient manner by suspending an airborne tree trimming apparatus from a helicopter or like aircraft, using a trapeze mount to facilitate more accurate cutting and easier deployment of the saw blades and boom into and out of the cutting configuration. In use, the articulated tree trimming apparatus is suspended from the trapeze mount such that the circular saw blades slope slightly rearwardly from the attachment point at the trapeze along a flight path beneath the helicopter, and such that very small branches and woody growth cannot pass between any two adjacent blades without being cut. A primary factor in the cutting efficiency of the circular saw blades is the mounting of the blades and boom in a substantial, stable, yet pivoting or folding manner, to permit the large and heavy blades to cut through limbs of substantial size while the apparatus is airborne. Take-off and landing with the trapeze-equipped apparatus is a simple matter for a qualified helicopter pilot, due to the design of the trapeze and the front-to-rear articulation of the operating boom with respect to the boom extension, which permits the apparatus to be oriented on a pair of spaced, ground-supporting cradle supports beneath the helicopter at take-off or landing.

In addition to providing the above described features and advantages, it is an object of this invention to provide a helicopter-mounted trapeze mount for an airborne tree trimming apparatus, wherein the tree trimming apparatus is suspended from the trapeze mount and includes a downward-extending, articulated boom carrying a plurality of adjacent, powered circular saw blades, to provide a cutting path or swath in woody growth along a predetermined flight path.

It is another object of the invention to provide a trapeze mount pivotally attached to a helicopter and adapted to receive and support a boom equipped with multiple internal combustion engine-driven circular saw blades mounted in tandem, substantially co-planar relationship on the boom. The boom is mounted to the trapeze by means of a boom mount bar and sliding collar, in order to facilitate selectively carrying the boom in downwardly-suspended cutting configuration and resting the boom on supports located on the ground as the boom is disposed beneath and rearwardly of the helicopter pursuant to pivoting of the trapeze mount.

Still another object of the invention is to provide a self-contained, helicopter-mounted trapeze apparatus and an airborne tree trimming device pivotally suspended from the trapeze apparatus by means of a boom mount bar and sliding collar, which tree trimming device is capable of being powered independently of the helicopter by means of multiple circular saw blades arranged in tandem configuration on a substantially vertical operating boom and driven by a governer-controlled internal combustion engine, the circular saw blades being sufficiently large and heavy to generate significant momentum and inertia for optimum airborne cutting efficiency.

Still another object of the invention is to provide a trapeze apparatus for suspending a boom containing a set of spaced circular saw blades, wherein the trapeze is pivotally suspended from a helicopter and includes a boom mount bar having one end pivotally and releasably attached to a quick-release hook mounted on the helicopter and the opposite end stabilized on the trapeze by means of a sliding collar and attached to one end of a boom carrying rotating cutter blades, such that the trapeze can be deployed rearwardly of the helicopter along with the boom, to locate the boom and the cutting blades on the ground and the trapeze can be alternatively deployed downwardly from the airborne helicopter to suspend the boom beneath the helicopter in cutting configuration.

SUMMARY OF THE INVENTION

These and other objects of the invention are provided in a trapeze mount for mounting a cutting boom to a helicopter, which trapeze mount includes a generally U-shaped trapeze frame pivotally attached to a helicopter, a boom mount bar pivotally and releasably suspended from a quick-release hook mounted on the undercarriage of the helicopter, with the boom mount bar also attached to the trapeze apparatus by means of a sliding collar, wherein the boom mount bar secures an operating boom by means of a lower pivot collar, to selectively suspend the boom and an associated set of boom-mounted cutter blades beneath the helicopter in cutting configuration and rearwardly of the helicopter on spaced supports located on the ground in non-functional, stored configuration.

Other objects and advantages of this invention will be apparent from a consideration of the following description in conjunction with the appended drawings, wherein:

FIG. 1 is a perspective view of the trapeze mount for an air-borne tree trimming apparatus pivotally attached to a helicopter and oriented to suspend an airborne tree trimming apparatus downwardly in functional cutting configuration;

FIG. 2 is a side view, partially in section, of the trapeze mount illustrated in FIG. 1, with the trapeze pivot bars pivoted rearwardly parallel to the helicopter to deploy the air-borne tree trimming apparatus in ground-storage configuration;

FIG. 3 is a side view, partially in section, of the trapeze mount illustrated in FIG. 2, with the trapeze pivot bars pivoted downwardly to deploy the airborne tree trimming apparatus in suspended, functional cutting configuration;

FIG. 4 is a rearward sectional view taken along line 4—4 of the trapeze mount illustrated in FIG. 2;

FIG. 5 is a rearward sectional view taken along line 5—5 of the trapeze mount illustrated in FIG. 3;

FIG. 6A is a side view of the trapeze mount and helicopter, with the trapeze mount oriented in horizontally pivoted configuration to deploy the airborne tree trimming apparatus on ground-located supports in non-functional configuration;

FIG. 6B is a side view of the trapeze mount and helicopter in phantom, illustrating a first stage of lifting the airborne tree trimming apparatus by operation of the trapeze mount to deploy the trapeze mount and the airborne tree trimming apparatus downwardly in functional, cutting configuration;

FIG. 6C is another phantom view of the trapeze mount and helicopter apparatus illustrated in FIGS. 6A and 6B in a second stage of lifting, with the trapeze mount and the airborne tree trimming apparatus further deployed downwardly; and FIG. 6D is yet another phantom view of the trapeze mount for airborne tree trimming apparatus in a third stage of lifting, with the trapeze mount and the airborne tree trimming apparatus disposed substantially downwardly from the helicopter substantially in functional, cutting configuration.

DESCRIPTION OF THE PREFERRED EMBODIMENTS

Referring initially to FIGS. 1-5 of the drawings, the trapeze mount for airborne tree trimming apparatus of this invention is generally illustrated by reference numeral 1 and includes a pair of parallel pivot bars 2, each having one end pivotally attached to the fuselage 15 of a helicopter 10. The helicopter 10 is otherwise conventional in design, having a bubble canopy 12, a main rotor 13, a rear rotor 16 and pair of landing skids 21, connected to the fuselage 15 by spaced struts 14, respectively. In a preferred embodiment of the invention the pivoted ends of the pivot bars 2 are attached to the fuselage 15 by means of a pair of mount pivot joints 4, each of which is further characterized by a mount pivot bracket 5 and a cooperating mount pivot pin 6, as illustrated in FIGS. 2 and 5. The pivoting ends of the pivot bars 2 are each welded or otherwise securely attached to the mount pivot brackets 5, respectively, and the mount pivot pins 6 project through bearings or bushings 11, seated in the mount pivot brackets 5, respectively, and extend inwardly for fixed attachment into frame members (not illustrated) located in the fuselage 15 of the helicopter 10, which frame members are conventional in design and normally serve to attach steps (not illustrated) normally provided on the fuselage 15 of the helicopter 10. The opposite ends of the pivot bars 2 are welded or otherwise connected to a cross-bar 3, as illustrated in FIGS. 1 and 5 and a trapeze pivot joint 7 is pivotally attached to the cross-bar 3 by means of corresponding parallel trapeze pivot brackets 8 and a transverse trapeze pivot pin 9, which is seated in a pair of bearings 11, provided in the trapeze pivot brackets 8, respectively. In a most preferred embodiment of the invention, a sliding collar 28 is disposed in pivotal relationship on the trapeze pivot pin 9 between the parallel trapeze pivot brackets 8 and is square in cross-section, having a square cross-sectional opening (not illustrated) designed to receive a correspondingly-shaped, elongated boom mount bar 26. One end of the boom mount bar 26 is fitted with a mount bar clevis 29, having a release pin 27, which engages a quick-release hook 68, mounted to a hook bracket 74, secured to the fuselage 15 of the helicopter 10. The hook bracket 74 is welded or otherwise fixed to the fuselage of the helicopter 10 and serves to support the quick-release hook 68 by means of a hook pin 73, as illustrated in FIGS. 2 and 3. The boom mount bar 26 is square in cross-sectional configuration and slidably extends through the correspondingly-shaped sliding collar 28, to facilitate alternatively pivoting the pivot bars 2 and the cross-bar 3 into a configuration which is substantially parallel to the fuselage 15 of the helicopter 10, as illustrated in FIGS. 2 and 4, and downwardly in substantially vertical, functional configuration, as illustrated in FIGS. 1, 3 and 5. The bottom end of the boom mount bar 26 is attached to a lower pivot collar 30, which is characterized by a pair of parallel lower pivot collar plates 31, having a lower pivot collar pin 32 extending transversely therethrough, in order to receive and mount the upper end of the boom 22 to the lower end of the boom mount bar 26. It will be appreciated from a consideration of FIGS. 2-5 that the boom 22 is constrained to move in a plane parallel to the flight path of the helicopter when the trapeze mount 1 is pivoted into both the folded, nonfunctional configuration illustrated in FIGS. 2 and 4 and in the deployed cutting configuration illustrated in FIGS. 3 and 5. However, by operation of the lower pivot collar 30, the boom 22 is also allowed to pivot in a plane perpendicular to the plane of flight of the helicopter 10, in order to lessen the lateral stress on the boom 22 and the quick-release hook 68 during flight. In each case, the boom 22 is prevented from rotating or oscillating with respect to the helicopter 10, since the square boom mount bar 26 is slidably seated in the square receiving receptacle of the sliding collar 28. Accordingly, as illustrated in FIGS. 6A and 6B, since the boom 22 supports the cutting section 23 and the drive section 24 of the airborne tree trimming apparatus, the blades (not illustrated) must always face substantially in a plane parallel to the flight path of the helicopter 10, although the boom 22, cutting section 23 and the drive section 24 may swing as a whole from side-to-side in a plane perpendicular to the path of flight of the helicopter 10, by operation of the lower pivot collar 30.

Referring again to FIGS. 1-5 of the drawing, in another preferred embodiment of the invention, the quick release hook 68 is characterized by a flat hook housing 69 which is attached to the fuselage 15 by means of the hook bracket 74, as heretofore described. The hook housing 69 further includes a hook slot 72, fitted with a keeper (not illustrated), designed to receive and retain the release pin 27, which extends through the mount bar clevis 29, in the hook slot 72. This secures the mount bar clevis 29 of the boom mount bar 26 and removably secures the boom mount bar 26, the boom 22, the cutting section 23 and the drive section 24 to the helicopter 10. However, should an emergency dictate that the boom 22 and the cutting section 23 be jettisoned for safety purposes by the helicopter pilot, a switch (not illustrated) located in the helicopter 10 can be manipulated for this purpose. Activation of this switch causes the keeper (not illustrated) to extend from the hook slot 72 into the hook housing 69 by operation of the actuating cable 71 and allows the release pin 27 to exit the hook slot 72 and the boom mount bar 26 to slide from within the sliding collar 28, thereby jettising the boom 22, the cutting section 23 and the drive section 24. A safety cable 66 is extended through an opening provided in the hook housing 69 and both ends of the safety cable 66 are secured to the mount pivot brackets 5, to prevent the boom mount bar 26 and boom 26 from falling away from the helicopter 10, in the event of failure of the hook pin 73 or the hook housing 69 of the quick-release hook 68.

In operation and referring again to the drawings, the trapeze mount 1 is used to lift the airborne tree trimming apparatus from a pair of spaced supports 20 located on the ground, by operation of the helicopter 10, as follows. Referring to FIGS. 2 and 6A, the boom 22 is initially attached to the lower pivot collar 30 by removing the lower pivot collar pin 32 from the lower pivot collar plates 31 and re-inserting the lower pivot collar pin 32 through the openings (not illustrated) in the lower pivot collar plates 32 and through a third opening (not illustrated) provided in the top end of the boom 22, as illustrated in FIG. 2. When the trapeze mount 1 is in the position illustrated in FIGS. 2 and 6A, the sliding collar 28 in the trapeze pivot joint 7 is disposed at the lower end of the boom mount bar 26 adjacent to the lower pivot collar 30, to facilitate rearward pivoting of the pivot bars 2 and the cross-bar 3, which action allows the boom mount bar 26 and the boom 22 to lie substantially parallel to the fuselage 15 of the helicopter 10, as illustrated in FIG. 6A. Referring now to FIG. 6B, as the helicopter rises, the sliding collar 28 begins to slide upwardly on the boom mount bar 26, toward the mount bar clevis 29 and the pivot bars 2 begin to pivot downwardly on the mount pivot joint 4 toward a substantially vertical orientation. As illustrated in FIG. 6C, as the helicopter 10 gains altitude, the boom 22 swings further downwardly, thereby further deploying the sliding collar 28 upwardly on the boom mount bar 26 and the pivot bars 22 move even further downwardly toward the vertical position. FIGS. 6C and 6D illustrate further advancement of the boom 22 downwardly to the cutting configuration as the helicopter 10 rises and when the airborne tree trimming apparatus is deployed substantially in the cutting configuration as illustrated in FIG. 1, the pivot bars 2 are deployed substantially vertically downwardly, the sliding collar 28 is located near the top of the boom mount bar 26 adjacent to the mount bar clevis 29 and the airborne tree trimming apparatus is ready for functional operation. Deploying the boom mount bar 26, the cutting section 23 and the drive section 24 of the airborne tree trimming apparatus back into the ground-located configuration illustrated in FIG. 6A, is accomplished by reversing the procedure outlined above and folding the trapeze mount 1 substantially parallel to the fuselage 15 of the helicopter 10, as illustrated.

Referring again to FIG. 4 of the drawing, while the respective cross-sectional configurations of the sliding collar 28 and the boom mount bar 26 are square, it will be appreciated that these elements of the trapeze mount 1 can be shaped in the configuration of any polygon, as desired, in order to prevent rotation or oscillation of the boom mount bar 26 and the boom 22. Accordingly, while the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A trapeze mount for an airborne tree trimming apparatus having a boom adapted for pivotal mounting to a helicopter, said trapeze mount comprising a boom mount bar having one end pivotally attached to the helicopter, with the opposite end of said boom mount bar attached to the boom, pivot bar means pivotally carried by the helicopter and collar means pivotally attached to said pivot bar means, said collar means slidably engaging said boom mount bar, whereby the boom is selectively adapted for deployment downwardly in cutting configuration when the helicopter is airborne and in substantially horizontal configuration for selective attachment to the helicopter and detachment from the helicopter.

2. The trapeze mount of claim 1 wherein said pivot bar means further comprises a pair of pivot bars having one end pivotally secured to the helicopter, respectively, and a cross-bar connecting the opposite ends of said pivot bars, with said collar means pivotally carried by said cross-bar.

3. The trapeze mount of claim 2 further comprising lower pivot collar means provided on said opposite end of said boom mount bar for receiving and supporting the boom.

4. The trapeze mount of claim 2 wherein said collar means further comprises a pivot joint attached to said cross-bar in pivotal relationship and a collar carried by said pivot joint bar for slidably receiving said boom mount bar.

5. The trapeze mount of claim 2 wherein said collar means further comprises a pivot joint attached to said cross-bar in pivotal relationship and a collar carried by said pivot joint bar for slidably receiving said boom mount bar and further comprising lower pivot collar means provided on said opposite end of said boom mount bar for receiving and supporting the boom in pivotal relationship, wherein the boom is pivotal in a plane which is transverse to the direction of travel of the helicopter.

6. The trapeze mount of claim 4 wherein said collar is further characterized by an internal receptacle shaped in the configuration of a polygon and said boom mount bar is shaped in the configuration of said polygon for slidably engaging said receptacle in non-rotatable relationship.

7. The trapeze mount of claim 6 further comprising lower pivot collar means provided on said opposite end of said boom mount bar for receiving and supporting the boom in pivotal relationship, wherein the boom is pivotal in a plane which is transverse to the direction of travel of the helicopter.

8. The trapeze mount of claim 7 wherein said polygon is a square.

9. A trapeze mount for an airborne tree trimming apparatus having a boom adapted for pivotal suspension from a quick-release hook mounted on a helicopter, said trapeze mount comprising trapeze means pivotally carried by the helicopter; collar means pivotally secured to said trapeze means; and boom mount bar means having one end pivotally and releasably attached to the quick-release hook and the opposite end of said boom mount bar means attached to the boom and wherein said collar means slidably receives said boom mount bar means, whereby the boom is deployed substantially vertically downwardly in cutting configuration when the helicopter is airborne and the boom is oriented in substantially horizontal configuration when resting on a supporting surface.

10. The trapeze mount of claim 9 wherein said trapeze means further comprises a generally U-shaped pivot bar having each end pivotally secured to the helicopter in spaced relationship, with said collar means pivotally carried by said pivot bar and a boom mount bar having one end pivotally attached to the helicopter, with the opposite end of said boom mount bar attached to the boom and said collar means slidably receiving said boom mount bar.

11. The trapeze mount of claim 10 further comprising lower pivot collar means provided on said opposite end of said boom mount bar for receiving and supporting the boom in pivotal relationship, wherein the boom is pivotal in a plane which is transverse to the direction of travel of the helicopter.

12. The trapeze mount of claim 10 wherein said collar means further comprises a pivot joint attached to said pivot bar in pivotal relationship and a collar carried by said pivot joint for slidably receiving said boom mount bar.

13. The trapeze mount of claim 10 wherein said collar means further comprises a pivot joint attached to said pivot bar in pivotal relationship and a collar carried by said pivot joint for slidably receiving said boom mount bar and further comprising lower pivot collar means provided on said opposite end of said boom mount bar for receiving and supporting the boom in pivotal relationship, wherein the boom is pivotal in a plane which is transverse to the direction of travel of the helicopter.

14. The trapeze mount of claim 13 wherein said collar is characterized by an internal receptacle shaped in the configuration of a polygon and said boom mount bar is shaped in the configuration of said polygon for slidably engaging said receptacle in non-rotatable relationship.

15. The trapeze mount of claim 14 wherein said polygon is a square.

16. A trapeze mount for an airborne tree trimming apparatus having a cutting boom adapted for pivotal suspension from a helicopter by means of a quick-release hook, said trapeze mount comprising a pair of pivot bars having one end pivotally carried by the helicopter in spaced relationship; a cross-bar connecting the opposite ends of said pivot bars and a boom mount bar having one end pivotally and releasably attached to the quick-release hook and the opposite end of said boom mount bar means attached to the boom; and collar means pivotally carried by said cross-bar wherein said collar means slidably receives said boom mount bar, whereby the boom is deployed substantially vertically downwardly in cutting configuration when the helicopter is airborne and the boom is oriented in substantially horizontal configuration when located on a supporting surface which is independent of the helicopter.

17. The trapeze mount of claim 16 further comprising lower pivot collar means provided on said opposite end of said boom mount bar for receiving and supporting the boom.

18. The trapeze mount of claim 16 wherein said collar means further comprises a pivot joint attached to said cross-bar in pivotal relationship and a collar carried by said pivot joint for slidably receiving said boom mount bar.

19. The trapeze mount of claim 16 further comprises a pivot joint attached to said cross-bar in pivotal relationship and a collar carried by said pivot joint for slidably receiving said boom mount bar and further comprising lower pivot collar means provided on said opposite end of said boom mount bar for receiving and supporting the boom in pivotal relationship, wherein the boom is pivotal in a plane which is transverse to the direction of travel of the helicopter.

20. The trapeze mount of claim 19 wherein said collar is further characterized by an internal receptacle shaped in the configuration of a polygon and said boom mount bar is shaped in the configuration of said polygon for slidably engaging said receptacle in non-rotatable relationship.

21. The trapeze mount of claim 20 wherein said polygon is a square.

* * * * *